(12) United States Patent
Middler et al.

(10) Patent No.: US 9,539,753 B2
(45) Date of Patent: Jan. 10, 2017

(54) DIRT PRECIPITATOR FOR A HIGHLY VISCOUS MEDIUM

(75) Inventors: Robert Middler, Havixbeck (DE); Jan-Udo Kreyenborg, Münster (DE); Stefan Wöstmann, Sassenberg (DE)

(73) Assignee: Nordson Corporation, Westlake, OH (US)

( * ) Notice: Subject to any disclaimer, the term of this patent is extended or adjusted under 35 U.S.C. 154(b) by 943 days.

(21) Appl. No.: 13/813,820

(22) PCT Filed: Jul. 21, 2011

(86) PCT No.: PCT/EP2011/062561
§ 371 (c)(1),
(2), (4) Date: Jul. 22, 2013

(87) PCT Pub. No.: WO2012/016846
PCT Pub. Date: Feb. 9, 2012

(65) Prior Publication Data
US 2014/0001111 A1  Jan. 2, 2014

(30) Foreign Application Priority Data
Aug. 3, 2010 (DE) .................. 10 2010 036 810

(51) Int. Cl.
*B29C 47/68* (2006.01)
*B29C 47/08* (2006.01)
(Continued)

(52) U.S. Cl.
CPC ........... *B29C 47/683* (2013.01); *B29C 47/081* (2013.01); *B29C 47/0815* (2013.01);
(Continued)

(58) Field of Classification Search
CPC .. B29C 47/683; B29C 47/081; B29C 47/0886; B29C 47/684; B29C 47/0815; B29C 47/0884; B29C 47/88; B29C 47/0009; B29C 47/681; B29C 47/68; B01D 29/52; B01D 29/54; B01D 33/37; B01D 33/48; B01D 33/00
(Continued)

(56) References Cited

U.S. PATENT DOCUMENTS 5,090,887 A  † 2/1992 Gneuss
5,200,077 A  * 4/1993 McNeice ............... B01D 33/00
210/323.2
(Continued)

FOREIGN PATENT DOCUMENTS

DE  4040024 A1  6/1992
DE  4215472 C1  5/1993
(Continued)

OTHER PUBLICATIONS

International Patent Application No. PCT/EP2011/062561, International Search Report issued Jul. 19, 2012, 9 pages (3 pages English Translation).
(Continued)

*Primary Examiner* — Madeline Gonzalez
(74) *Attorney, Agent, or Firm* — Baker & Hostetler LLP

(57) ABSTRACT

The invention relates to a dirt precipitator (100) for a highly viscous medium, having a housing comprising a front housing element (30; 30') that comprises at least one inlet channel (33) and a rear housing element (20) that comprises at least one outlet channel (23), and having a screen wheel (10; 10') rotatably mounted between the housing elements (20, 30; 30') having a number n of screen positions disposed in a ring zone, on each of which at least one screen opening (11.1, . . . , 11.12) having at least one screen insert element is provided. The inlet channel (33), the outlet channel (23), and the screen opening (11.1, . . . , 11.12) are disposed flush one after the other in at least one working position and form a flow channel. In all positions of the screen wheel (10; 10'), more than 50% of the screen openings (11.1, . . . , 11.12) are always able to be permeated, and are impinged by flow from at least one inlet channel and from which at least one outlet channel leads.

17 Claims, 9 Drawing Sheets

(51) Int. Cl.
*B29C 47/00* (2006.01)
*B29C 47/88* (2006.01)

(52) U.S. Cl.
CPC ...... *B29C 47/0884* (2013.01); *B29C 47/0886* (2013.01); *B29C 47/684* (2013.01); *B29C 47/0009* (2013.01); *B29C 47/68* (2013.01); *B29C 47/681* (2013.01); *B29C 47/88* (2013.01)

(58) Field of Classification Search
USPC ....... 210/230, 231, 330, 393, 324, 329, 232, 210/325, 359, 398, 354, 333.1, 780, 790, 210/108; 425/199, 197; 55/285, 484
See application file for complete search history.

(56) References Cited

U.S. PATENT DOCUMENTS

| | | | |
|---|---|---|---|
| 5,362,223 | A † | 11/1994 | Gneuss |
| 5,407,586 | A † | 4/1995 | Gneuss |
| 5,516,426 | A | 5/1996 | Hull et al. |
| 7,976,706 | B2 | 7/2011 | Gneuss |
| 2008/0179261 | A1 | 7/2008 | Patrovsky |
| 2008/0314815 | A1 † | 12/2008 | Gneuss |

FOREIGN PATENT DOCUMENTS

| | | | |
|---|---|---|---|
| DE | 4212928 | A1 | 10/1993 |
| DE | 19700468 | A1 † | 7/1998 |
| DE | 19734588 | A1 | 2/1999 |
| DE | 10151496 | A1 | 12/2002 |
| DE | 102006056471 | A1 | 5/2008 |
| EP | 379966 | A2 | 8/1990 |
| WO | 2004108393 | A1 | 12/2004 |

OTHER PUBLICATIONS

International Patent Application No. PCT/EP2011/062561, Written Opinion issued Jul. 19, 2012, 27 pages (15 pages English Translation).
International Patent Application No. PCT/EP2011/062561, International Preliminary Report on Patentability issued Feb. 5, 2013, 30 pages (17 pages English Translation).

\* cited by examiner
† cited by third party

DIRT PRECIPITATOR FOR A HIGHLY VISCOUS MEDIUM

The invention relates to a dirt precipitator for highly viscous media, with the features of the generic part of claim 1.

In order to filter out clumps and foreign substances in a highly viscous medium such as a plastic melt, sieves are connected into the fluid current that must be increasingly added and replaced during operation. In order to be able to maintain a production operation during the replacement or the cleaning of the sieves, among other things generic dirt precipitators with a sieve wheel are known on which several sieve positions are arranged, for example, from EP 379 966 A2. The latter consist of a front housing element and a back housing element between which a sieve wheel is arranged. The sieve wheel contains a plurality of sieve openings, that is, perforations of the disk-shaped sieve wheel that are provided with a permeable sieve element. An inlet channel and an outlet channel are provided in the housing elements, whereby an inlet channel and an outlet channel are located in series, in particular in alignment, and form, one after the other, a through flow channel with one of the perforations in the sieve wheel. If the sieve position currently being permeated is too heavily contaminated, the sieve wheel is rotated through an angle, so that the next following sieve position is pivoted into the flow channel. As the sieve wheel is rotated further, whether incrementally or continuously, the contaminated sieve position is brought into the area of a sieve change opening in the housing at which the sleeve position is readily accessible. There the sieve element can be removed and exchanged.

The dirt precipitator described in EP 379 966 A2 also discloses a backwash function in order to be able to loosen deposits from the dirty side of the sieve and thus to be able to clean the sieve without completely removing it from the sieve opening. To this end melt is branched off from the flow channel on the backside of the housing and guided back from the clean sieve side through the sieve position. Particles adhering to the sieve element can therefore be loosened by the backup pressure present from behind and be washed outside of the housing. The backwash opening, that establishes the connection to the outer side of the housing, can be closed with a movable slide.

The known generic dirt precipitator has the disadvantage that only a few sieve positions are in operation and are present inside a through flow channel whereas the other sieve positions distributed over the sieve wheel, that are still filled with the medium, remain unused, as a result of which the throughput at the cross section of the flow channel of the sieve position that is in production is limited.

In order to make a greater throughput possible sieve elements are provided that are distinctly greater than the opening cross section of the inlet and outlet channels, so that funnel-like transitions must be provided. This has the result that the fluid current in the outer areas of a flow channel must traverse greater paths than in the center. The consequence is an inhomogeneous fluid dwell time spectrum in the area of the sieve position.

In addition, there is the danger that during the long duration of time from the moving out of a sieve position from the flow channel until it is moved back again a decomposition of material occurs. This is a danger in particular in plastic melts, in which the plastic material present in the perforation in the sieve wheel is held for a rather long time in the heated housing, as a result of which carbonizations can occur. This adversely affects the quality of the filtered melt.

The advantage of the dirt precipitators provided with a sieve wheel in comparison to other proved constructions consists in a simple and economical construction. In distinction to the sieve bolt changers, that operate very reliably and have proven themselves, in a dirt precipitator with a sieve wheel a cylinder and a bore do not have to be precisely coordinated with one another with a fit but rather it is sufficient in the case of sieve wheel dirt precipitators to grind plane the contact surfaces between the housing elements and the sieve wheel sealing surfaces. The two housing elements are then tightened against one another with the sieve wheel located between them. A good tightness is achieved by the surface contact of the front surfaces of the sieve wheels with the housing surfaces.

The present invention has the problem in the case of a dirt precipitator with a sieve wheel of the initially cited type to increase the throughput and in particular to reduce the danger of a decomposition of material at the sieve positions not in a position of production.

This problem is solved by a dirt precipitator with the features of claim 1.

The concept "sieve position" is used for those positions at which inlet and outlet (sub) channels are aligned in series in the housing and a sieve opening is located between them in the sieve wheel.

The feature that the inlet channel, the outer channel and the sieve opening "are in series" in at least one working position does not obligatorily bring about oblong geometric bodies with exactly aligned central axes but rather is it only means that in a working position the inside cross sections of the mouths of inlet channels and outlet channels and of the sieve opening at least partially overlap so that a flowthrough is made possible.

On the other hand, "sieve opening" designates the concrete perforation in the sieve wheel, that is closed with a sieve element and forms together with the latter a "sieve position" that continually changes its position with the rotation of the sieve wheel.

"Ring zone" designates a ring surface on the sieve wheel and on the adjacent surfaces of the housing elements which ring surface is projected in the direction of the flowthrough. The sieve openings as well as the mouths of the inlet and outlet channels are arranged in the ring zone. The sieve openings can be arranged inside the ring zone on a common, unified partial circle but also on several partial circles at a distance from each other. Whereas in the prior art only some or a few sieve positions—i.e. a maximum of 35-40% of the sieve available on the sieve wheel—are moved into the flow channel and out of it again in the manner of a revolver when they are dirty, the invention consciously takes the other path and puts the majority of the sieve positions into the production operation, whereby less than half of the sieve positions, in particular even only a fourth of even less are not in the production and can be cleaned or replaced.

The effective filter surface is clearly realized with the simultaneous loading of the majority of the sieve openings on the sieve wheel. The sieve openings can be designed in such a manner that they fit to a great extent into the cross section of the inflow and of the outflow, as a result of which more favorable flow conditions result than in known, generic sieve devices, in which in part considerable widenings are provided at the sieve openings in order to be able to make a greater filter surface available.

The special effect of the construction principle in accordance with the invention surprisingly resides, however, in the fact that in the case of highly viscous media a self-leveling of the flow paths occurs.

In the individual sleeve openings, that are impinged by at least one inlet channel and from which at least one outlet channel departs, similar flow conditions result as the operating time increases, independently of how the flow paths to the individual sleeve openings are constructed.

If, for example, a flow channel is provided that extends starting from the inflow opening as an arch or polygonal course from one sieve opening to the next one and if the same structural conditions are provided as regards the cross section of the sieve opening and of the fineness of the sieves used, then those sieve positions that are closer to the inflow opening initially have a stronger flowthrough than others that are further removed in the flow path. However, the sieves in the sieve openings that initially have a stronger flowthrough also become contaminated more rapidly with the greater volume current. As a consequence, the flow resistance rises there and the volume flow decreases locally. Assuming constant conditions in the inflow opening and the outflow opening, the throughput at the more remote sieve positions, that at first became less contaminated and correspondingly offer a relatively lesser flow resistance, increases relative to the above. The consequence is that an extensive equilibrium is established automatically between the partial flows through the individual sieve positions as long as partial flows do not completely dry up. In order to counteract this, individual sieve openings are brought into a maintenance position with the rotation of the sieve wheel, where they can be cleaned or replaced.

The changing of the position of the sieve positions relative to the inlet- and outlet channels based on the rotation of the sieve wheel can also contribute to the fact that, viewed over a longer production time, the same flow conditions are adjusted at all sieve openings.

Corresponding to the previously described effect of a self-leveling, the inlet channel and/or the outlet channel can be arranged centrally, therefore, in the area of the middle axis of the sieve wheel but also off-center, that is, outside of the area of the middle axis of the sieve wheel.

The central arrangement is constructively more expensive in as far as a support of the sieve wheel is provided in the housing via an axis or shaft in the center since then the support must be circumvented by the flow paths. On the other hand, the central arrangement makes possible a division of inlet- and/or outlet channel into individual partial channels that are geometrically the same. As a consequence, the same flow conditions are not adjusted by the self-leveling effects only with the increasing production time but rather already at the beginning of the production. A decentralized arrangement of inlet- and outlet channel facilitates the arranging of a central axis or shaft for supporting the sieve wheel. It is then advantageous if the partial inlet channels and/or the partial outlet channels have the same flow resistances by a corresponding adaptation of channel lengths and channel cross sections.

In particular, it can be provided, in addition to the given construction parameters for the geometry of the flow channels for the partial inlet channels and/or for the partial outlet channels to also make the ambient temperature changeable along the particular partial channel by tempering elements and to then coordinate length, cross section and ambient temperature of the partial channels in such a manner with each other that same volume flows result in each partial channel in as far as there are identical flow resistances at the sieve positions.

A branching of the inlet channel and of the outlet channel preferably takes place in a plurality of partial inlet and partial outlet channels. As a consequence thereof, the fluid current on the front housing element in the direction of flow is distributed onto a plurality of sieve positions and combined again at the backside of the housing. At this time up to 90% of the sieve openings are constantly in coincidence with the partial inlet- and partial outlet channels and the flow can pass through them in all angle positions of the sieve wheel that are possible relative to the housing elements. Only at least one sieve position is not fed in the production operation so that there, at a sieve replacement position provided in the housing, the sieve element can be removed and the perforation in the sieve wheel can be cleaned in its entirety.

At the same time, as a result of the fact that as many as possible sieve positions are constantly in production operation, the danger of rather long dwell times of the material and therefore the danger of material decompositions is reduced. A sieve position still filled with fluid receives no flowthrough at the most during the rotation of the sieve wheel by one angular step. However, this time is so short that the danger of material decompositions is excluded.

The branching of the inlet channel into several partial inlet channels can take place in a stellate manner so that a partial inlet channel runs from a central inlet channel radially outward to the particular sieve position.

It is furthermore possible that a distributor channel is provided that is arranged in the ring zone or traverses the ring zone and that is connected to several sieve positions and that can supply several sieve positions at the same time. This distributor channel is supplied, for example, from one or both its ends or from the middle. Thus, partial channels that are aligned in a chain-like manner run from sieve position to sieve position.

Furthermore, mixed forms are possible in which stellate partial inlet channels emanate from a central inlet channel, whereby they do not, however, communicate with only one individual sieve position but rather are combined on the partial circle of the sieve positions once again to one or more arched distributor channels. As a result of the fact that a melt flux is then possible not only centrally from the inlet channel to the sieve positions but rather also along the partial circle from one sieve position to the next one, an optimal thorough mixing is achieved and therefore the danger of material decompositions is especially effectively prevented.

The previously described branches in a star-like shape as well as in the distributor channels on the partial circuit are also possible on the back side of the housing in order to recombine the melt carried out at the individual sieve positions. It is not necessary to select the branching principle or distributor principle on the back side of the housing which principle is present on the front side of the housing. Here too mixed forms are possible in order to achieve the best-possible flowthrough for the particular application.

At least one partial inlet- and one partial outlet channel run in the housing to a partial amount of possible sieve positions and, namely, to a number
    corresponding to at least 0.5 times the total number n of possible sieve positions, and
    up to at the most n−1 sieve positions.

A sieve change opening is then provided in at least one of the housing elements at an nth position.

In the case of a very small sieve wheel with n=4 sieve positions, for example, there is exactly one sieve change position. The other three sieve positions, corresponding to 75% of the sieve positions formed on the sieve wheel, are preferably in production position at the same time.

However, the advantages of the invention result in particular in the case of rather large sieve wheels with as many sieve positions as possible. Other than in the prior art, where only one sieve position is in production and the others are waiting unused or are being washed and/or cleaned and a greater construction tends to result in disadvantages on account of a longer dwell time, in accordance with the invention the achievable throughput is greater the more sieve positions are present.

Preferably, n=12 and the openings of the partial inlet- and partial outlet channels as well as the sieve positions are arranged on the sieve wheel like the numbers on a clock on a common partial circle. This distribution of the sieve positions in 12×30° steps is simple to manufacture and makes use of the available space in an annular area of a sieve wheel with a diameter of 400 mm to 2000 mm that can be readily managed and optimally with a diameter of the sieve positions of 100 mm to 200 mm.

The partial inlet- and/or the partial outlet channels widen out like a funnel preferably on the surface of the housing elements facing the sieve wheel so that the actual flow channels remain slender and only their mouths are so great that the sieve openings constructed with a greater cross section in the sieve can receive a complete flowthrough.

An especially advantageous embodiment provides constructing every next position but one on both sides of the sieve change position at least in the back housing element with an longitudinal extension, in particular shaped like an oblong hole. This brings it about that the sieve positions can receive a longer flowthrough than at the other positions, namely, until they have almost reached the sieve change position. The melt flow then breaks off shortly before this point, whereby, however, the pressure in the sieve cavity can also be degraded toward the clean side so that an exiting of melt at the sieve change position is avoided.

"Longitudinal extension" in the sense of the present invention designates all longitudinally extended contours that go beyond a circular form and therefore extend further along the ring zone. This includes oblong hole shapes in the traditional sense as well as ellipses or also asymmetrical shapes.

Instead of providing the opening on the outlet side in a longitudinally extended manner, a branch canal can also laterally follow the opening cross section of the partial outlet channel.

An oblong hole is preferably also provided in the next position but one in the direction of rotation of the sieve wheel behind the sieve change position so that the sieve cavity at the next position following the sieve change position can already be loaded again from the clean sieve side with melt when it has just left the first sieve change position.

In order to refill and ventilate the just-cleaned sieve opening in the sieve wheel it is preferably provided that at least one of the sieve positions is constructed as a ventilating position, whereby at least one partial outlet channel in the back housing part runs to the clean side of the ventilation position, and whereby a ventilation opening extends to the outer side of the housing from the dirty side of the ventilation position.

In order to be able to loosen adhesions on the sieve on the dirty side with a melt pressure that can be loaded from the clean side, it can furthermore be provided that at least one of the sieve positions is designed as a backwash sieve position, whereby at least one partial outlet channel in the back housing part runs to the clean side of the backwash sieve position, and whereby a backwash opening extends to the outer side of the housing from the dirty side of the backwash sieve position.

Viewed from a construction standpoint, the ventilation position and the backwash position can be designed in the same manner. A pre-flooding of an empty sieve opening and a ventilation can be brought about from the dirty sieve side as well as from the clean sieve side. A ventilation channel provided for the escape of air must merely be arranged in such a manner that it preferably follows at the top of the sieve opening.

On the other hand, during backwash the position of the mouth of the backwash channel is not important but the direction of flow from the clean sieve side to the dirty side is.

If these requirements are brought to a common denominator, the combined ventilation and backflow position results at which melt is introduced from the back—that is, from the clean side—into the sieve opening and at which melt and/or air can again escape via a backwash- and ventilation opening emptying in the upper area of the cavity.

It is required in the vicinity of the sieve change position provided in the housing to maintain so great a distance to the next sieve position that can be flowed through that it is ensured independently of the particular angular position of the sieve wheel that no melt can flow out of the sieve position into the sieve change opening either from the dirty side or from the clean side. To this end, for example, the diameter of the partial circle can be increased and/or the sieve position diameter can be reduced so that an increase of the distance from sieve position to sieve position results on the partial circle.

However, in order to be able to optimally utilize the surface available on the sieve wheel, it is better to pack the sieve positions closer to each other and to leave the positions in the direct vicinity of the sieve change position free instead. This means that, given a total of three positions that would be impinged given a uniform distribution on the partial circle, no connection channels should exist. These three positions are the sieve change position itself as well as the positions directly above it and below it.

If, for example, the sieve wheel comprises twelve sieve positions corresponding to the hour marks on a clock face, then the sieve change position can be arranged, for example, at the 3 o'clock position. The 2 o'clock position as blocking position and the 4 o'clock position as ventilation position then remain in the particular housing elements free of melt channels so that the particular sieve positions are not impinged there in the sieve wheel. This ensures that no melt passes from the vicinity into the sieve change position even if the sieve positions are arranged closely adjacent to each other.

In sum, this means that in a preferred embodiment the arrangement and use of the sieve positions is as follows:

At least one partial inlet channel and one partial outlet channel run in the housing to a number of at the most n−3 sieve positions from n possible positions that result given uniform distribution on a partial circle.

A sieve change opening is provided in at least one of the housing elements at an mth sieve position, whereby m<n.

A backwash sieve position is provided at an (m+1)th sieve position.

A blocking position is provided at an (m−1)th sieve position in order to make the sieve opening pressureless before it enters into the sieve change opening.

Partial outlet channels shaped like oblong holes are provided at an (m+2)th sieve position and at an (m−2)th sieve position.

In order to store the sieve wheel between the housing elements, rollers can be provided, whereby the roller arrangement surrounds the outer circumference of the sieve wheel.

Furthermore, it can be provided that a central shaft is attached to the sieve wheel which shaft is rotatably supported in a hub in the housing. Finally, it can be provided that a circular recess is provided in the center of the sieve wheel and that a corresponding shoulder or pin is formed on at least one of the housing elements on which shoulder or pin the sieve wheel is then supported in a support recess in the housing.

The invention is described in detail in the following using an exemplary embodiment and with reference made to the drawings, whereby the filtration of plastic melt is described by way of example. In the figures.

Figure 1:
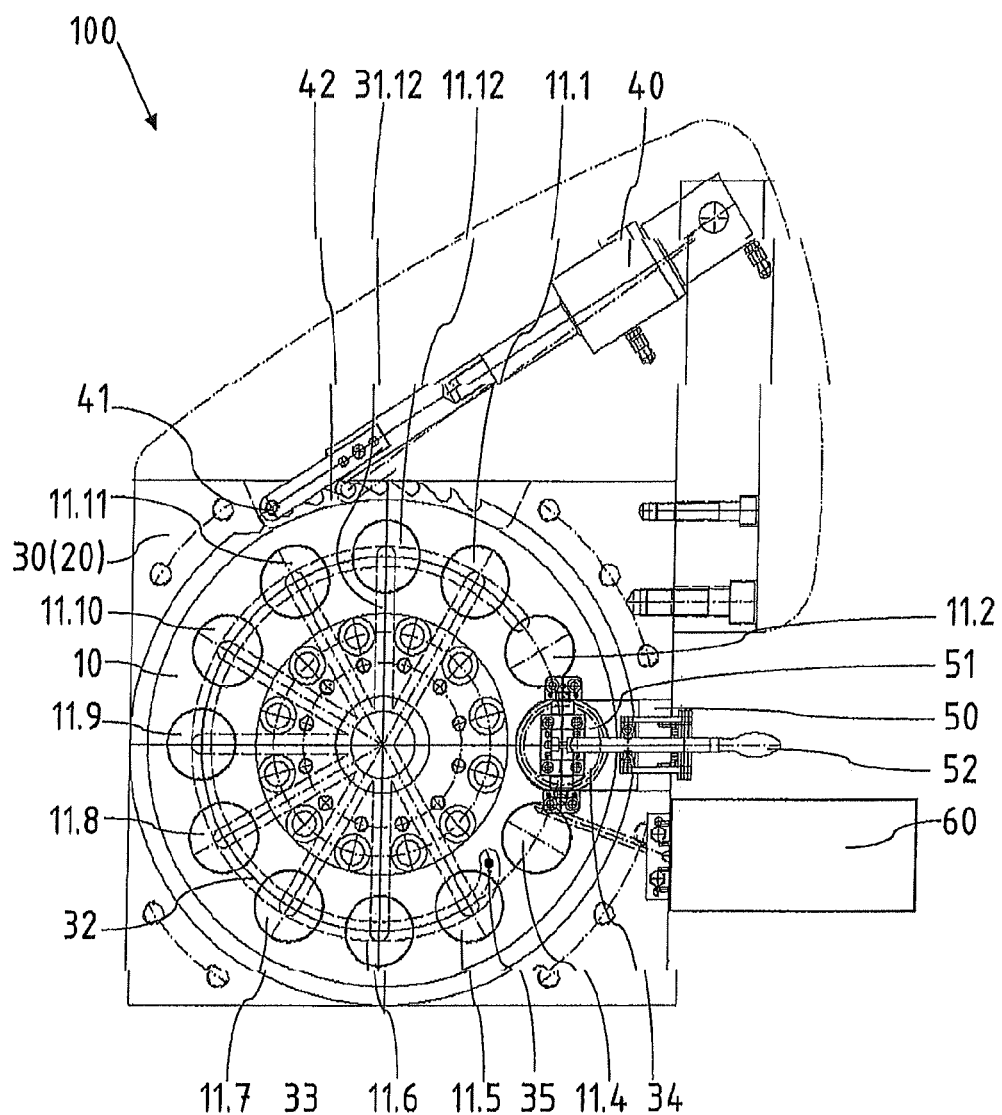
FIG. 1 shows a dirt precipitator in accordance with a first embodiment in a frontal view.

FIG. 1 shows a complete dirt precipitator 100 viewed from the front—viewed in the direction of flow—onto a housing that comprises a front housing element 30 and a rear housing element 20. The housing elements 20, 30 are arranged at a distance from each other and enclose a rotatable sieve wheel 10 with a plurality of sieve positions 11.1 . . . 11.12 between themselves.

A drive unit 40 is built onto the housing and comprises in this case a pneumatic cylinder that is pivotably supported and that has a cam element 41 on its end which cam engages into the cogging 42 formed on the outer circumference of the sieve wheel 10. Due to the intrinsic weight of the drive unit 40 the cam element 41 always rests on the cogging 42. It moves with a slight advance movement over the flank of the next following tooth and drops behind it so that it rotates the sieve wheel 10 by a certain angle when viewed clockwise during the next following retreat movement. This design of the drive, that is known, represents an especially simple and effective conversion of a step-by-step operation.

A closing device 50 with a sieve change flap 51 is arranged on the front housing element 30 in the area of a sieve change opening, that can be locked by a lever element 52 relative to the housing and that will be explained in more detail in the following.

Underneath which, on the right housing edge, a blocking unit 60 is arranged with which an outlet opening of a backwash- and ventilation channel 35 (cf. FIG. 2a-2d) can be closed.

Figure 2A:
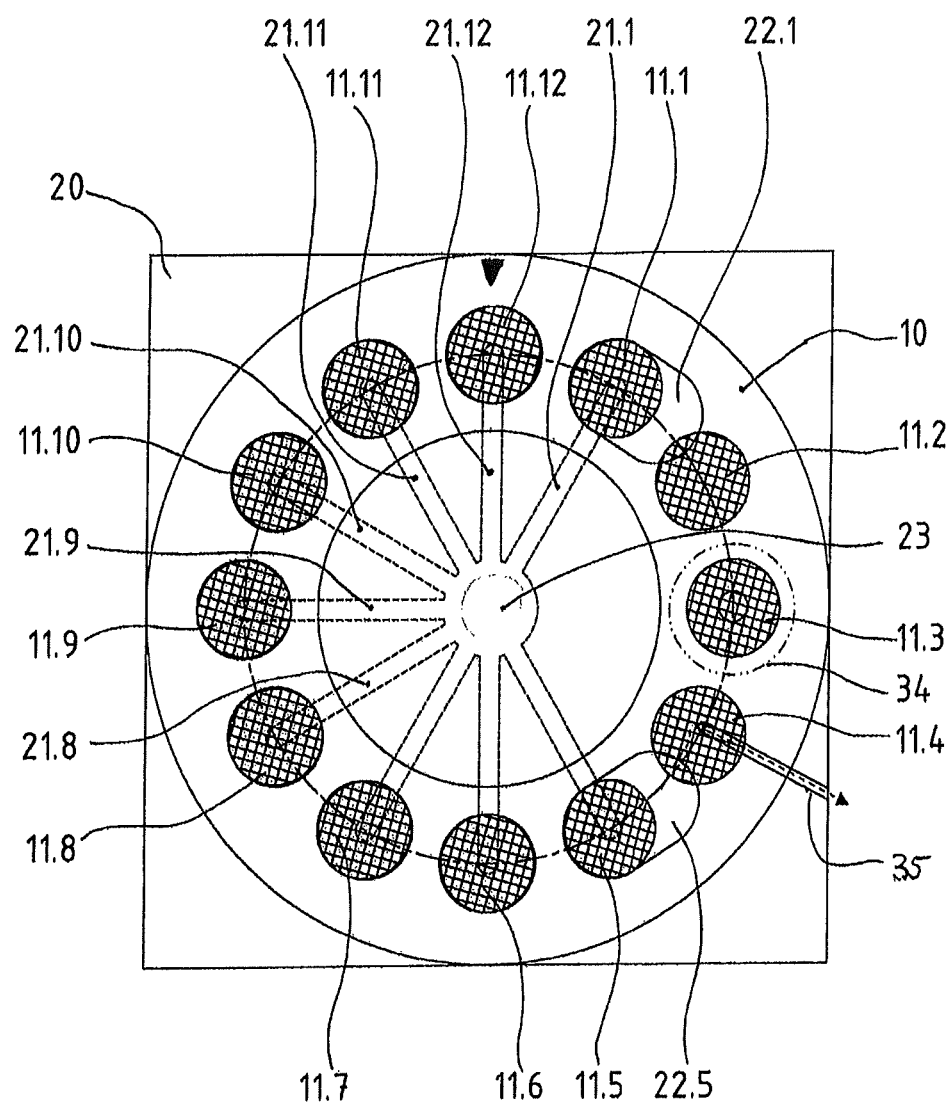
FIGS. 2a-2d show a dirt precipitator in a schematic view from the front in different positions of the sieve wheel.

FIG. 2a shows a view onto the dirt precipitator 100 with removed front housing element, thus, with a view directly onto the sieve wheel 10 and the rear housing element 20 located behind it.

In the exemplary embodiment shown the sieve wheel 10 has twelve sieve positions 11.1 . . . 11.12 arranged like the numbers on a dial face. The sieve positions 11.1 . . . 11.12 are designed in this example as circular perforations in the disk-shaped sieve wheel 10 that are provided with sieve elements in the form of wire grids.

In the rear housing element 20 a partial outlet channel 21.1 . . . 21.12 runs from each sieve position 11.1 . . . 11.12 in the form of spokes to a central outlet channel 23 in the housing 20.

In the FIGS. 2a to 2d a triangular mark is attached on the sieve wheel 10 above a sieve position 11.12 in order to illustrate the progressive rotary movement in the sequence of the figures.

In the representation according to FIG. 2a most of the funnel-shaped mouths of the particular partial outlet channels in the rear housing element 20 are not visible since they are covered in the position of the sieve wheel 10 shown in FIG. 2a by the sieve positions. The mouths shaped like oblong holes 22.1, 22.5 of the partial outlet channels 21.1 and 21.5 are visible only at the 1 o'clock position and the 5 o'clock position.

The sieve position 11.1 is in coincidence in FIG. 2a with the left part of the mouth 22.1. The part next to it on the right is partially open but still overlaps a little with the next following sieve position 11.2 at the 2 o'clock position.

Now, if the melt is conducted through the sieve position 11.2 at the front housing element (not shown) at the 2 o'clock position it can flow off via the mouth 22.1 of the partial outlet channel 21.2; a corresponding situation applies for the other sieve positions 11.2 . . . 11.12 and partial outlet channels 21.2 . . . 21.12.

The dotted line designated with 34 at the 3 o'clock position characterizes a sieve change opening 34 present in the front housing part 30. In the position according to FIG. 2a of the sieve wheel 10 the sieve position 11.3 is located precisely at the 3 o'clock position and therefore inside the sieve change opening 34.

In the rear housing element 20 there is no connection at this position with one of the partial outlet channels 21.2 . . . 21.12. There is also no connection with one of the partial inlet channels on the front housing element 30. The sieve position 11.3 present at the 3 o'clock position is therefore pressureless if it is located inside the sieve change opening 34 and is therefore readily accessible for maintenance work.

The sieve position 11.4 that is again the next following one is in partial coincidence at the position of the sieve wheel 10 according to FIG. 2a on the clean sieve side with the oblong-shaped, widened mouth of the partial outlet channel 22.5 and at the same time with a backwash- and ventilation channel 35 arranged on the dirt side, therefore, in the front housing element 30, and which runs to the outer side of the housing. The medium such as, for example, plastic melt, can flow via the overlapping area of the sieve position 11.4 with the mouth 22.5 of the partial outlet channel 21.5 on the clean side through the sieve position 11.4 and can flow off from there via the channel 35 to the outer side of the housing, as a result of which deposits present on the dirt side can be washed away.

Figure 2B:
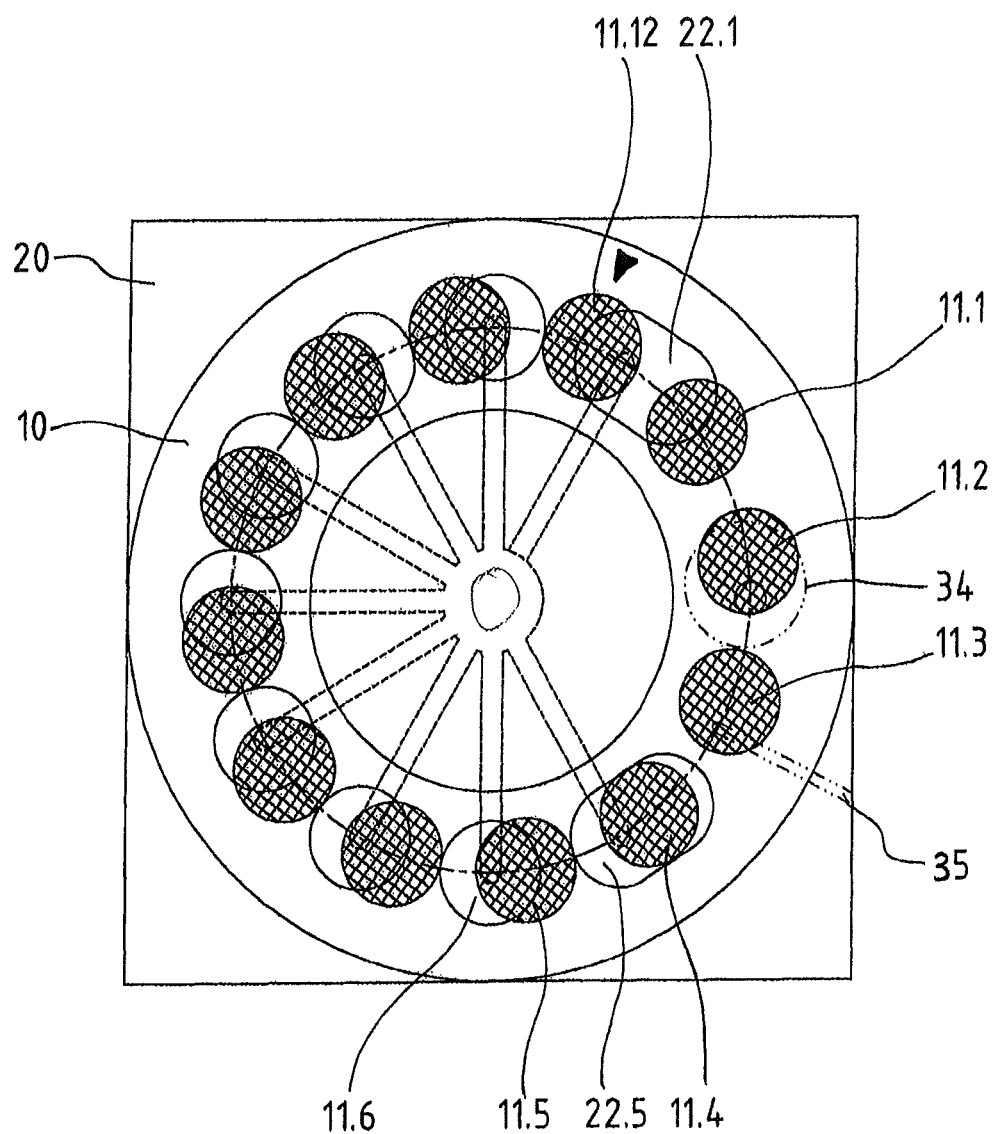

FIG. 2b shows a position of the sieve wheel 10 that is changed by a few degrees of angle relative to the position according to FIG. 2a. The sieve position 11.3 has now exited out of the sieve change opening 34 and already communicates with the backwash- and ventilation channel 35. At the same time the sieve position 11.4 is in the area of the oblong-shaped mouth 22.5 and already receives a flowthrough again there.

Figure 2C:
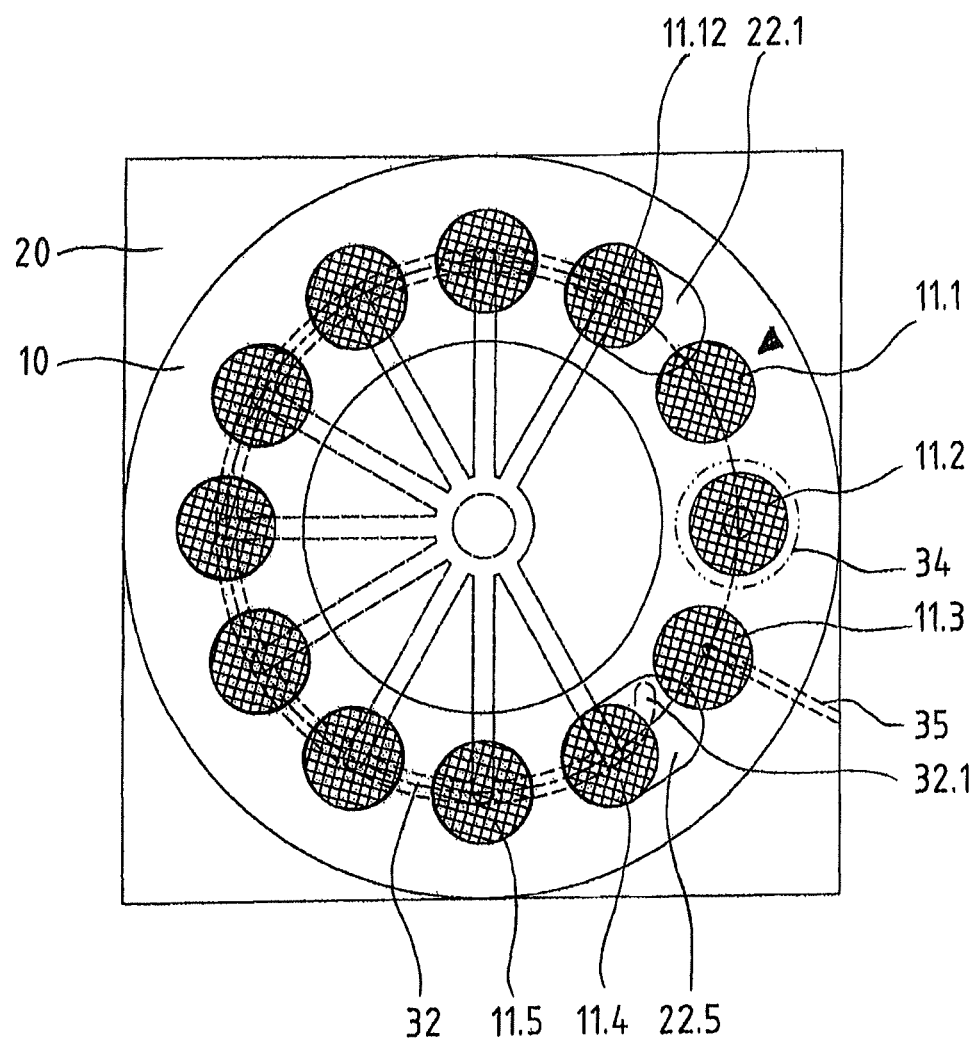

In FIG. 2c the sieve wheel is rotated by one complete angular step relative to the position in FIG. 2a, therefore, through 30° in the arrangement of twelve sieve positions 11.1 . . . 11.12. The sieve position 11.3 is now located in the position at "3 o'clock" at which the sieve position 11.4 was previously in FIG. 2a, namely, with partial coincidence with the oblong-shaped mouth 22.5 as well as with the backwash- and ventilation channel 35, so that now the backwash of the sieve position 11.3 can take place. However, there is still no coincidence with a finger-shaped, curved continuation 32.1 of the melt inlet channel 32 in the front housing element 30.

Figure 2D:
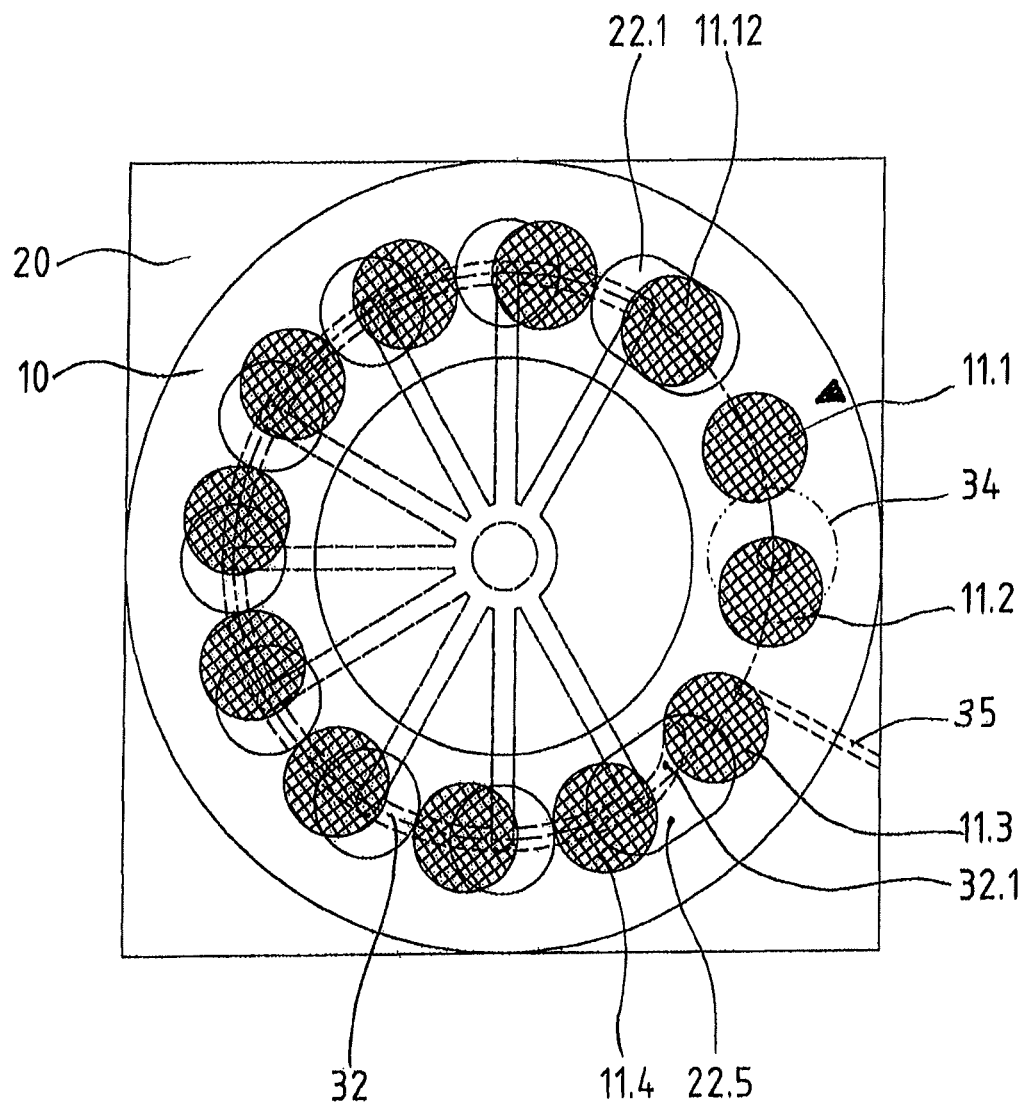

In the position according to FIG. 2d the sieve position 11.3 has come in coincidence with the continuation 32.1. The sieve position 11.3 can now also be flooded above it on the dirty side of the sieve with melt; the rear area on the clean side of the sieve position has already been flooded by the previous backwash procedure. Air still remaining in the sieve position 11.3 can escape via the channel 35.

Figure 3:
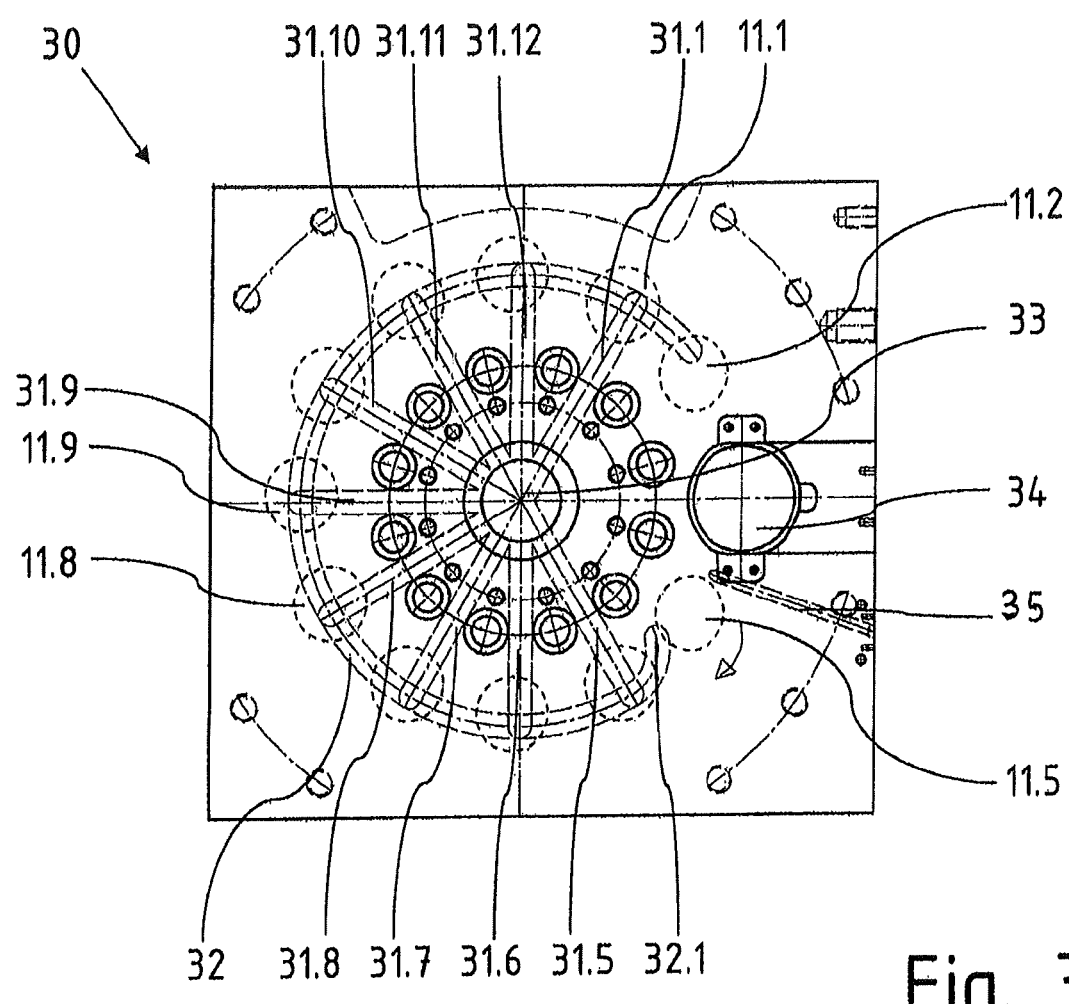
FIG. 3 shows a front housing element in a schematic view from the rear.

FIG. 3 shows a view in the direction of flow onto the front housing part with its central inlet channel 33, that branches in the shape of a star into a plurality of partial inlet channels 31.1 . . . 31.12. the partial inlet channels 31.1 . . . 31.12 arranged is a stellate pattern are combined again on an arched distributer channel 32, which extends beginning at a position between 2 o'clock and 3 o'clock over an arc of almost 270° counterclockwise up to an end position between "4 o'clock" and "5 o'clock".

The end of the arched distributer channel 35 in the area of the partial inlet channel 31.5 no longer runs on the partial circle but runs with a greater curvature than continuation 32.1 in the direction of the center. This special end-side construction of the distributor channel 32 has the purpose of nevertheless making possible, given a close arrangement with as many sieve positions as possible on the sieve wheel 10, thus, with little distance from each other, a separation between the functions "backwash" according to FIG. 2c and "ventilation" according to FIGS. 2a and 2d, and therefore to have to occupy only one possible sieve position on the partial circle for both functions together.

With the sieve change position necessary for the removal or cleaning as well as the backwash- and/or ventilation position, therefore only two of the possible positions can no longer be used for the filtration in the production operation. The "2 o'clock" position still makes possible a flowthrough with limited cross section. The supply of the medium is not interrupted until shortly before reaching the "3 o'clock" position in order to make the sieve position pressureless. In contrast thereto, at all the other positions the sieve positions can have an unlimited and constant flowthrough so that in the exemplary embodiment shown here of twelve possible positions only two cannot be used at all for the filtration. The degree of availability of the sieve positions for filtration purposes is therefore more than 80%.

Figure 4:
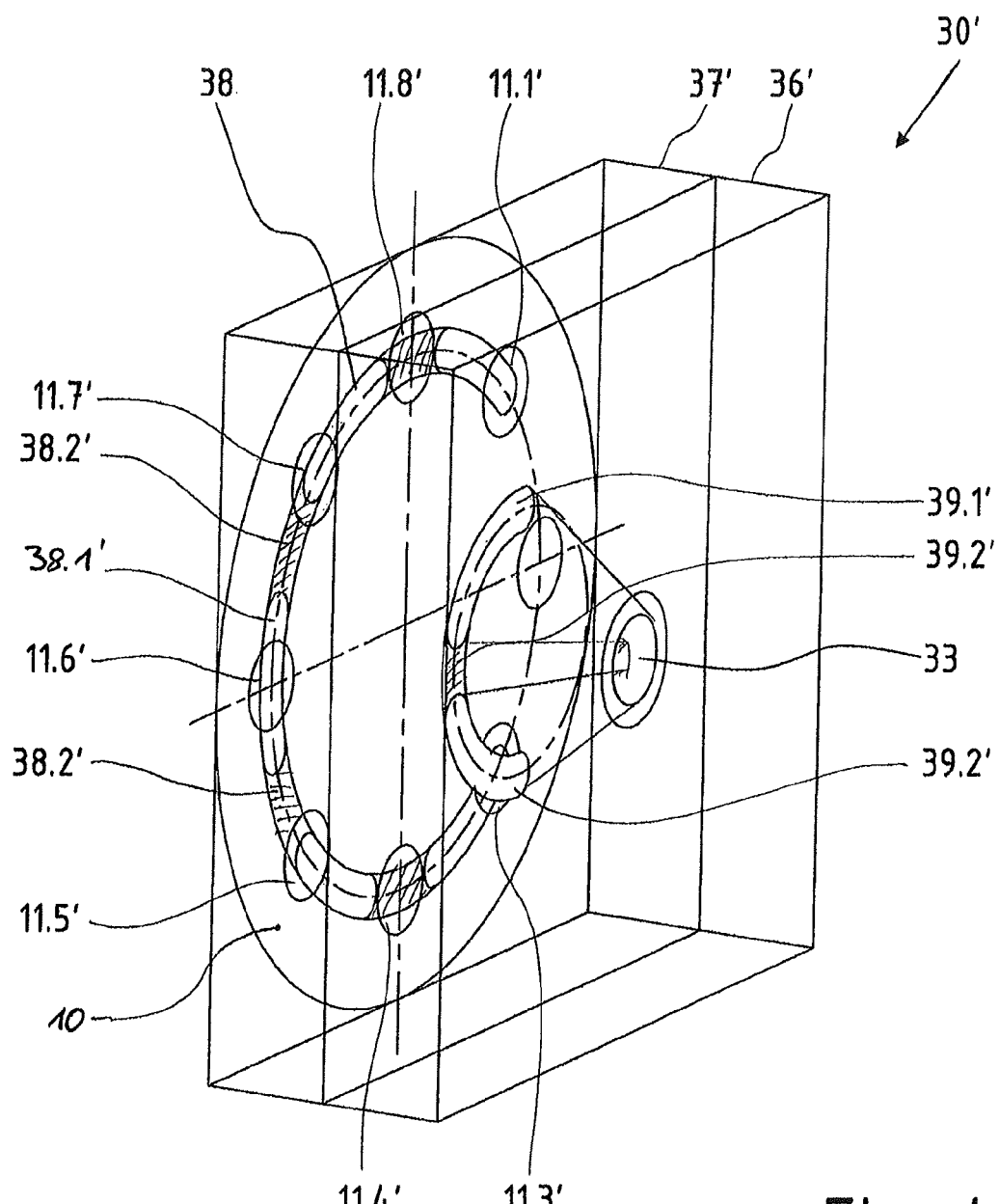
FIG. 4 shows an alternative embodiment of a front housing element in a schematic, perspective view.
Figure 5:
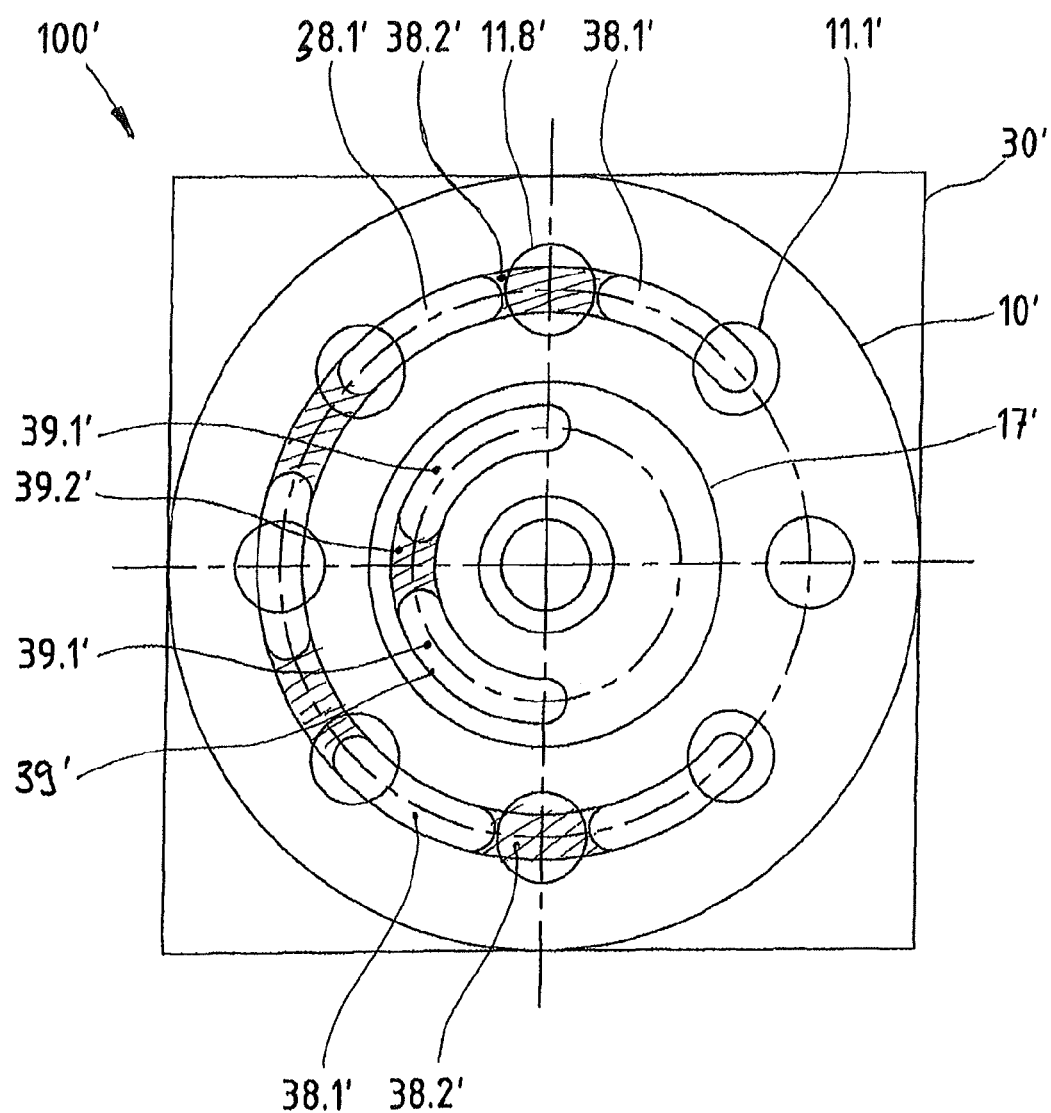
FIG. 5 shows the housing element of the embodiment according to FIG. 4 in a front view.
Figure 6:
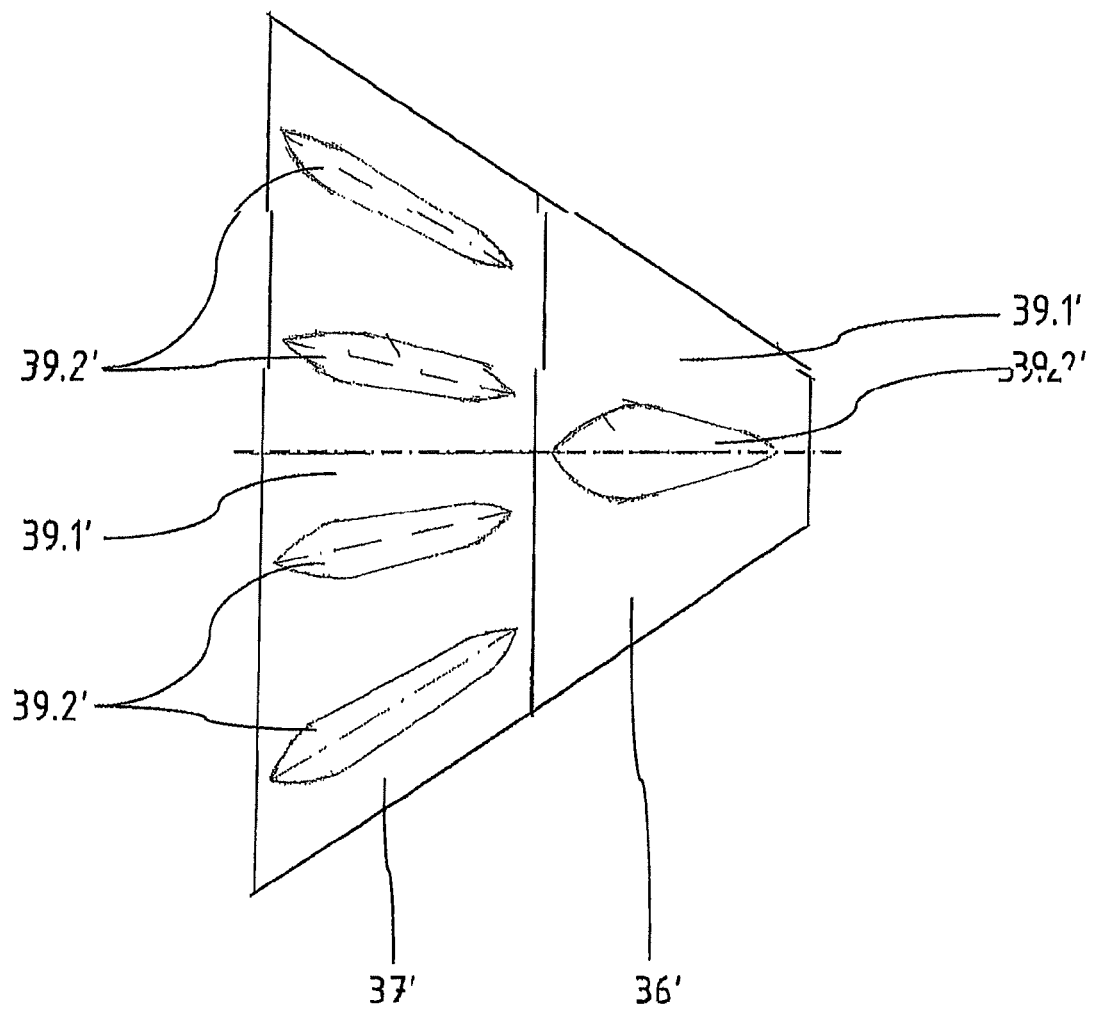
FIG. 6 shows a partial development of a flow channel for the embodiment according to FIGS. 4 and 5.

FIGS. 4 to 6 show another embodiment of a dirt precipitator 100' in which only eight sieve positions 11.1' . . . 11/8' are provided on the sieve wheel 10' for drawing reasons.

FIG. 4 shows a schematic perspective view of a front housing element 30' formed from two partial plates 36', 37' for reasons of manufacturing technology. The outer housing surface with a central inlet channel 33 is on the right in FIG. 4. On the left is the rear housing surface at which the partial inlet channels empty and on which the sieve wheel 10' rests. The direction of flowthrough in FIG. 4 is therefore from right to left.

As FIG. 5 also shows, an arched distributor channel 38' is provided on the rear housing surface and extends from an angular position at 45° over an arch of approximately 270° to an angular position at 315°. The distributer channel 38' has no perforations directly on the rear housing surface so that a through, arched distributor channel results that can uniformly supply all sieve positions on the sieve wheel in front of it.

Alternating, completely open flow channel sections 38.1' and webs 38.2' of solid material are provided slightly offset in the interior of the partial plate 37'. The open flow channel sections 38.1' run through the partial plate 37' to the dividing plane between the partial plates 36', 37' and serve to supply the medium. The webs 38.2' serve to support the material areas inside the arched distributor 38' on the outer material areas and to achieve on the whole a high rigidity of the housing.

Another arched distributor channel 39' is provided in the dividing plane between the partial plates 36', 37' that extends only over approximately 180° and whose radius is clearly less than the radius of the distributor channel 38'. The open flow channel sections 38.1' of the distributor channel 38' empty into the open flow channel sections 39.1' of the distributor channel 39'; the open flow channel sections 39.1' of the distributor channel 39' again open in the central inlet opening 33'. Again, a web 39.2' remains between them as support.

The webs 38.2', 39.2' also serve as flow dividers inside the open flow channel sections 38.1', 39.1', as the development of a flow channel shown in FIG. 7 shows.

Two goals are achieved with the design of the interior of the front housing element 30' shown in FIGS. 4 to 6:

If the front housing element 30' in FIG. 5 is viewed from a top view, it is recognized that an annular area forms inside between the distributor channels 38' and 39' which is sufficiently supported by the webs 38.2' so that it is possible to form the inner area as a hub 17 and to rotatably support the sieve wheel 10 on it.

In addition, it is clear from FIG. 6 in particular that the volumetric component of the hollow flow channels 38.1', 39.1' is high in comparison to the material areas remaining in the form of the webs 38.2', 39.2' and that at the same time the limiting surface of the flow channel walls is small. With this ratio of wall surface to flow channel volume the adhesion of a viscous medium such as a plastic melt on the wall surfaces of the flow channels is reduced and therefore the flow resistance is reduced.

The construction of a rear housing element is not shown that should take place in analogy with the front housing element 30' in order that a hub can also be constructed there for supporting the sieve wheel.

The invention claimed is:

1. A dirt precipitator for highly viscous media, said dirt precipitator comprising:
a housing having a front housing element, a rear housing element, and a ventilation channel, said front housing element comprising an inlet channel, said rear housing element comprising an outlet channel, and said ventilation channel comprising an outlet opening; and
a rotatably supported sieve wheel between said front and rear housing elements, said sieve wheel having a number "n" of sieve positions arranged in a ring zone, each said sieve position including a sieve opening, and each said sieve opening receiving a sieve insert element having a clean side and a dirty side, wherein:

each said sieve opening, when in a work position, is located in series with said inlet and outlet channels to collectively form a flow channel;

the dirt precipitator is configured such that at all sieve positions of the sieve wheel, more than 50% of said sieve openings are (i) in fluid connection with said inlet channel and said outlet channel, and (ii) arranged to receive a continuous flow therethrough;

said inlet channel branches into a plurality of partial inlet channels or said outlet channel branches into a plurality of partial outlet channels;

at least one of said "n" sieve positions is a backwash sieve position, at least one of said partial outlet channels extending through said rear housing element to said clean side of said sieve opening at said backwash sieve position; and said ventilation channel extends from said dirty side of said sieve insert element at said backwash sieve position to said outlet opening.

2. The dirt precipitator according to claim 1, wherein said sieve wheel has an axis of rotation about which said sieve wheel is rotatable, said inlet channel or said outlet channel arranged centrally relative to said sieve wheel and adjacent to the axis of rotation of said sieve wheel.

3. The dirt precipitator according to claim 1, wherein said sieve wheel has an axis of rotation about which said sieve wheel is rotatable, said inlet channel or said outlet channel arranged off-center relative to said sieve wheel and distal from the axis of rotation of said sieve wheel.

4. The dirt precipitator according to claim 1, wherein said sieve wheel has an axis of rotation about which said sieve wheel is rotatable, said inlet channel branches into said partial inlet channels at a branch point on or at the axis of rotation of said sieve wheel, or said partial outlet channels are united with said outlet channel at a collection position on or at the axis of rotation of said sieve wheel.

5. The dirt precipitator according to claim 1, wherein said partial inlet channels each have a common flow resistance, or said partial outlet channels each have a common flow resistance.

6. The dirt precipitator according to claim 1, wherein said partial inlet channels each have a common length and a common cross section, or said partial outlet channels each have a common length and a common cross section.

7. The dirt precipitator according to claim 1, further comprising a plurality of tempering elements arranged relative to said partial inlet channels or said partial outlet channels to adjust an ambient temperature along said partial inlet channels and/or said partial outlet channels such that the ambient temperature, a length, and a cross section of each partial inlet or outlet channel maintain a common volume flow in each such partial inlet channel or in each such partial outlet channel.

8. The dirt precipitator according to claim 1, further comprising a distributor channel, at least one of said partial inlet channels or at least one of said partial outlet channels connected to said distributor channel, said distributor channel arranged in said ring zone or traversing said ring zone, said distributor channel connected to several sieve positions, said distributor channel provided in the form of an arch or a polygonal course.

9. The dirt precipitator according to claim 1, wherein several of said partial inlet channels emanate in a stellate form from said inlet channel or several of said partial outlet channels emanate in a stellate form from said outlet channel, thereby defining a stellate distributor arrangement.

10. The dirt precipitator according to claim 9, further comprising one or more arched distributor channels, said stellate distributor arrangement opening into at least one of said one or more arched distributor channels.

11. The dirt precipitator according to claim 9, wherein said dirt precipitator has a sieve change opening at one of said "n" sieve positions in at least one of said housing elements.

12. The dirt precipitator according to claim 1, wherein said housing has an outer side and said ventilation channel extends to said outlet opening on said outer side of said housing, at least one of said sieve positions is a ventilation position, and at least one of said partial outlet channels or at least one of said partial inlet channels extends to said ventilation position.

13. The dirt precipitator according to claim 12, wherein said backwash sieve position and said ventilation position are both located at a particular one of said sieve positions, and said outlet opening is configured for ventilation or backwash and is provided at said particular one of said sieve positions.

14. The dirt precipitator according to claim 12, further comprising a blocking slide unit that can close said outlet opening of said ventilation channel.

15. The dirt precipitator according to claim 1, wherein said partial inlet channels or said partial outlet channels widen out in a funnel shape at a side facing said sieve wheel.

16. The dirt precipitator according to claim 11, wherein one of said partial outlet channels is adjacent to said sieve change opening or is adjacent to said backwash sieve position and is widened in a direction of said sieve wheel to a non-circular distributor.

17. The dirt precipitator according to claim 1, wherein said sieve positions are arranged on two partial circles that are at a distance from one another.

* * * * *